United States Patent [19]
Cash et al.
[11] 4,366,954
[45] Jan. 4, 1983

[54] OUTBOARD MOTOR SUPPORT FRAME

[76] Inventors: Donald R. Cash; Wesley E. Ellison, both of Auburn, Wash.

[21] Appl. No.: 232,823
[22] Filed: Feb. 9, 1981
[51] Int. Cl.³ ..................... B23Q 3/00
[52] U.S. Cl. ..................... 269/289 R
[58] Field of Search ..................... 269/289, 296, 71, 45, 269/904, 901; 248/640, 643; 182/151; 440/900; 114/222; 254/134.3 FT, 134.3 R, 108

[56] References Cited

U.S. PATENT DOCUMENTS

| | | | |
|---|---|---|---|
| 1,653,267 | 12/1927 | Garber | 254/134.3 FT |
| 1,735,301 | 11/1929 | Short | 254/134.3 R |
| 1,750,199 | 3/1930 | Spahn | 269/296 |
| 1,750,200 | 3/1930 | Spahn | 269/296 |
| 2,686,028 | 8/1954 | Johnson | 246/643 |
| 2,764,381 | 9/1956 | Anderson | 248/643 |
| 2,913,241 | 11/1959 | Miner | 269/71 |
| 2,973,198 | 2/1961 | Marks | 269/71 |
| 3,026,105 | 3/1962 | Christianson | 269/289 |
| 3,394,920 | 7/1968 | Pomeroy | 254/134.3 R |
| 3,881,687 | 5/1975 | Johansson | 254/108 |
| 4,105,091 | 8/1978 | Mahan | 182/151 |
| 4,228,990 | 10/1980 | Horvath | 254/134.3 FT |

*Primary Examiner*—Robert C. Watson
*Attorney, Agent, or Firm*—Graybeal & Uhlir

[57] ABSTRACT

A mounting frame (10) for supporting an outboard motor (12) within a circular, open-topped receptacle (14), such as a garbage can, includes a pair of elongate, spaced-apart leg members (18) spanning across a portion of and resting upon the receptacle upper rim (16). Corner notches (22) are formed in one end portion of leg members (18) to cooperate with attached hooks (26) to thereby securely lock leg members (18) with rim (16). The opposite end of leg members (18) are transversely interconnected by a cross member (20) which is formed with spaced-apart, downwardly open notches (38) that slidably and closely engage within corresponding notches (40) formed in leg members (18). Cross member (22) serves as a mounting bar for motor (12).

8 Claims, 4 Drawing Figures

OUTBOARD MOTOR SUPPORT FRAME

DESCRIPTION

1. Technical Field

The present invention relates to an outboard motor mounting apparatus, and more particularly to a portable support frame for supporting an outboard motor within an open-topped receptacle, such as a garbage can.

2. Background Art

The cooling systems of boat outboard engines should be periodically flushed out to remove residues which have accumulated therein, especially at the end of a fishing or boating season and before the motor is placed into prolonged storage. It is especially important to flush out an outboard motor cooling system after use in salt water. If the salt residue is not washed out, it is possible for the components of the motor to corrode to such an extent that they become "frozen" in place. If this occurs the motor must be disassembled and each of its parts cleaned, an expensive and time consuming process.

A typical manner of flushing out an outboard motor cooling system is to operate the motor in clean, fresh water. This can be accomplished by holding the motor by hand in a tank or other type of receptacle while the motor is running. However, manually supporting the motor is not only very strenuous, but also can be dangerous since it may not be possible to hold the motor stationary enough to prevent it from hitting the sides, bottom or other portions of the tank. Also, it is very difficult both to hold the motor and try to start it at the same time.

In addition to the procedure of flushing out its cooling system, an outboard boat motor must also occasionally be supported in an upright position while repairing it or tuning it up. During the repair or tune-up process it is preferable that the motor be capable of being operated in water so that tests can be conducted and adjustments made to the motor under circumstances simulating actual running conditions.

While a repair shop may have the necessary equipment to support an outboard motor in a tank of water during the flushing of the cooling system or repair or tune-up of the motor, most typical small boat owners do not have these facilities available to them. Accordingly applicant has perceived a need for providing an affordable mounting frame capable of safely supporting an outboard motor within a commonly available receptacle which can be filled with water. Since most boat owners most likely either own or have access to a metal garbage can, the present invention is directed toward a compact, portable outboard motor mounting apparatus, especially adapted to support an outboard motor within a garbage can.

DISCLOSURE OF INVENTION

The present invention relates to a mounting apparatus for supporting an outboard motor within a water-filled receptacle or container having an open top, such as a garbage can which typically has an outwardly projecting rim extending around the upper edge of the can. The mounting apparatus includes a pair of elongate, spaced-apart leg members spanning across a portion of the can to rest on the upper rim. A corner notch is formed in the underside of a first end of each of the leg members to engage against the top and inside of the can rim. A hook member is mounted on the first end portion of each of the leg members to cooperate with the corner notches to form a downwardly open slot for receiving the can rim. The hooks hook over the outside portions of the rim to thereby securely lock the first end of the leg members with the rim to prevent the leg members from lifting upwardly away from the can.

The support apparatus also includes a cross member which transversely interconnects the second end portions of the leg members. A pair of spaced-apart, downwardly open notches are formed in the cross member to closely and slidably engage downwardly into corresponding, upwardly open notches formed in the second end portions of the leg members. By this construction, the cross member can be conveniently assembled with and disassembled from the leg members. Ideally the upwardly open notches are located along the second end portions of the leg members so that the cross member also spans across a portion of the open can. The cross member serves as a mounting bar for receiving a mounting clamp typically integrally formed with an outboard motor for attachment to the rear of a boat. Once the outboard motor has been mounted on the cross member and the garbage can filled with water, the motor may be operated to flush out the cooling system. Also, the present invention can safely support an outboard motor within a garbage can during repair and tune-up operations while not limiting access to the motor components.

BRIEF DESCRIPTION OF THE DRAWINGS

The details of one typical embodiment of the present invention will be described in connection with the accompanying drawings, in which.

BEST MODE OF THE INVENTION

Figure 1:
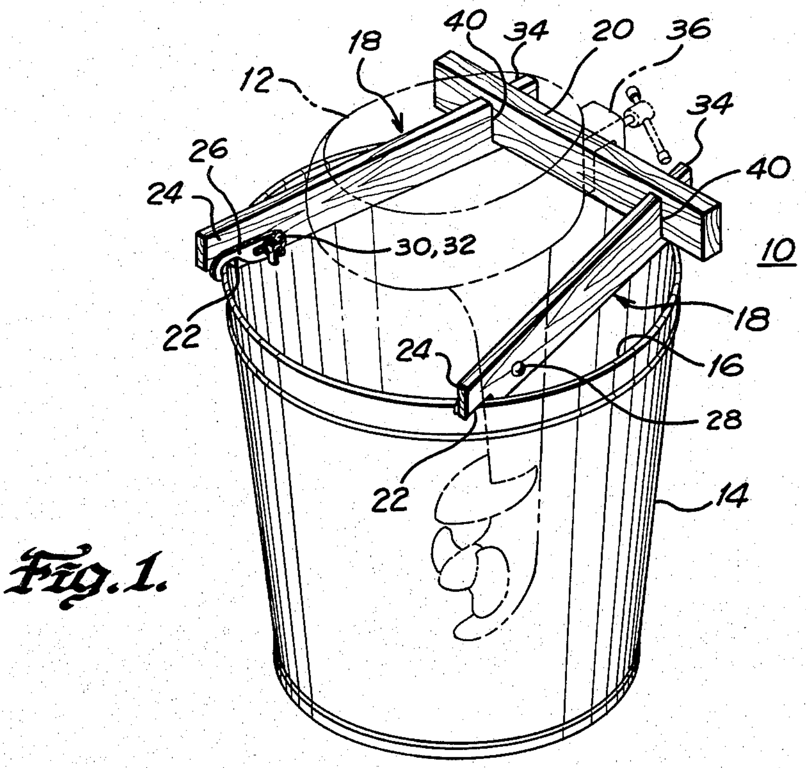
FIG. 1 is a top isometric view of a mounting apparatus constructed according to the present invention illustrated as supporting an outboard motor, shown in broken line, within a garbage can.

Referring initially to FIG. 1, a portable outboard motor mounting frame 10 constructed according to the best mode of the present invention currently known to applicants is illustrated as supporting an outboard motor 12 within a cylindrically-shaped, open topped receptacle 14, which may be a conventional metal garbage can. The upper edge portion of receptacle 14 is defined by an outwardly extending rim 16. Mounting frame 10 includes a pair of elongate, spaced-apart leg members 18 which rest on rim 16, and a cross member 20 which transversely interconnects corresponding end portions of leg members 18 to serve as a mounting bar for outboard motor 12.

Figure 2:
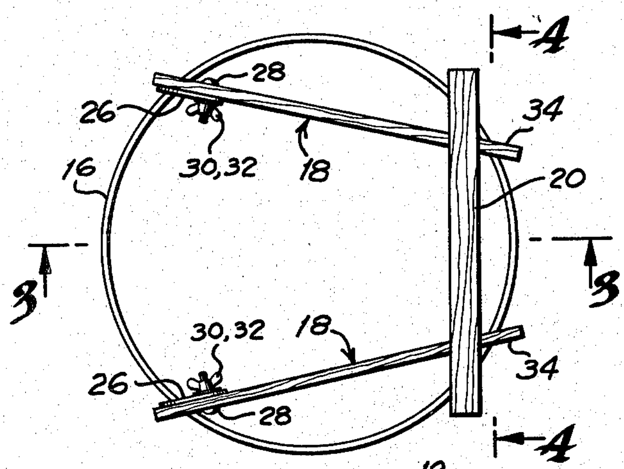
FIG. 2 is a top view of the outboard motor mounting apparatus illustrated in FIG. 1.
Figure 3:
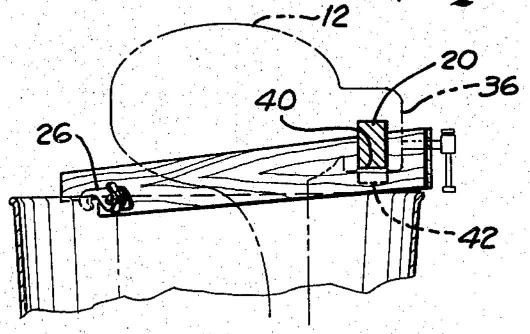
FIG. 3 is a cross-section view of the outboard motor mounting apparatus illustrated in FIGS. 1 and 2, taken substantially along lines 3—3 of FIG. 2.

As best shown in FIGS. 1-3, leg members 18 are generally rectangular in cross section and are disposed edgewise on top of rim 16 in slightly askewed relationship to each other to thereby cordwise span across portions of receptacle 14. A downwardly and endwardly extending notch 22 is formed in the underside of a first end portion 24 of each of the leg members to bear against the top and inside portions of rim 16. As most clearly shown in FIG. 1, notches 22 extend transversely across the width of leg members 18.

A generally flat, downwardly open hook is mounted on first end portions 24 of each leg member 18 to overlie the inside surfaces of the leg members. Hooks 26 are held in place by conventional hardware such as carriage bolts 28 which extend through clearance holes provided in the hooks and the leg members to engage with a flat washer 30 and nut 32. Hooks 26 hook over the outside of rim 16 to thereby cooperate with corner notches 22 to securely attach leg first end portions 24 to the rim. As a consequence, the leg first end portions are restrained from raising upwardly away from receptacle 14 when motor 12 is operated in reverse direction which operation imposes a torque on cross member 22 acting in the clockwise direction as viewed in FIG. 3.

Figure 4:
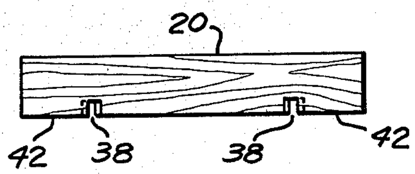
FIG. 4 is a fragmentary elevation view of the outboard motor mounting apparatus illustrated in FIGS. 1-3, taken substantially along lines 4—4 of FIG. 2 and specifically illustrating the construction of the cross member.

As illustrated in FIGS. 1 and 2, second end portions 34 of leg members 18 are transversely interconnected by an elongate, rectangularly shaped cross member 20 which extends beyond the exterior sides of the leg members. Cross member 20 serves as a mounting bar to which attachment clamp 36 of motor 12 is secured. As most clearly shown in FIG. 4, a pair of spaced-apart, downwardly open notches 38 are formed in the lower edge portion of cross member 20. Notches 38 closely and slidably engage downwardly within corresponding upwardly open notches 40 formed in leg member second end portions 34. It is important that cross member 20 and leg members 18 fit fairly tightly together so that the cross member does not vibrate or rattle during operation of motor 12. Since leg members 18 are not disposed in parallel relationship to each other, but rather spread outwardly in opposite directions from each other as they extend away from cross member 20, notches 38 and 40 are not formed perpendicularly to the length of cross member 20 and leg members 18, respectively. Instead, notches 38 and 40 are slightly transversely askewed from a plane extending perpendicularly across cross member 20 and leg members 18. If notches 38 and 40 were not formed in this manner, an excessively loose fit would exist between cross member 22 and leg members 18 resulting in excessive vibration of mounting apparatus 10 and motor 12.

As best illustrated in FIG. 3, ideally the lower edge 42 of cross member 20 is disposed slightly above the adjacent lower edges of leg member second end portions 34 so that the cross member does not rest on rim 16. Spacing cross member lower edge 42 above the top of rim 16 ensures that the weight of motor 12 is used not only to keep cross member engaged with leg members 18, but also to maintain the leg members in downward contact with rim 16. As a consequence, no additional means are required to fix leg second end portions 34 to rim 16.

When motor 12 is operated in the forward direction, a torque load is imposed on cross member 20 acting in the counterclockwise direction as viewed in FIG. 3. This torque load theoretically tends to cause leg members 18 to pivot upwardly about first end portions 24. However, the weight of motor 12 combined with the relatively long distance separating cross member 20 and leg first end portions 24 prevents leg second end portions 34 from raising upwardly away from rim 16.

For durability and for economy and ease of construction, ideally leg members 18 are formed from laminated, water-repellent wooden members, such as marine plywood. Constructing leg members 18 from plywood rather than from solid lengths of wooden material minimizes the possibility that the leg members will split, crack or otherwise fail under load in the regions of notches 22 and 40. If leg members 18 were made from unitary wooden members, the grain layers may split or separate apart from each other at the corners of the notches thereby greatly reducing the strength of the members.

As most clearly shown in FIG. 3, leg members 18 are not of constant height, but rather taper downwardly in the direction extending from second end portion 34 towards first end portion 24. It is possible to taper leg members 18 in this manner without reducing the load carrying capacity of the leg members since any bending loads imposed on the leg members by torques generated by motor 12 decreases along the length of the leg members in the direction away from second end portion 34. Tapering leg members 18 along their lengths maximizes the bend load carrying capacity of the leg members per unit of material used to form the leg members. Nevertheless, it is possible to form leg members 18 from lengths of constant height materials.

For optimum durability and economy of manufacture, preferably cross member 20 is constructed from a unitary wooden member, such as a two-by-four which is large enough in cross section to safely support smaller size outboard motors, i.e. in the range of ten horsepower or smaller. For compact transportation and storage of mounting apparatus 10, preferably cross member 20 is of the same length as leg members 18.

Mounting apparatus 10 is assembled by first hooking hooks 26 over the outer edge of rim 16 while holding leg members 18 in tilted position so that the leg second end portions 34 are disposed upwardly of leg first end portions 24. Then the leg members are lowered to set second end portions 34 on rim 16 thereby causing corner notches 22 to engage with rim 16. The only additional step required is to slide cross member 20 into downward engagement with notches 40. The close fit between cross member notches 38 and leg member notches 40 ensures that the leg members are correctly positioned relative to each other, i.e. flairing outwardly away from cross member 22 in the direction toward first end portions 24. Disposing leg members 18 in this fashion enables them to span across a substantial portion of rim 16 for greater stability while also permitting the leg members to be formed as short as possible. Moreover, flairing the leg members outwardly provides open access to virtually all parts of motor 12.

Motor 12 can now be simply lowered into receptacle 14 and clamping member 36 secured to cross member 20. With motor 12 thusly supported by mounting apparatus 10, receptacle 14 may be filled with water and then the motor run to flush out salt residue disposed in the cooling system. While held in this upright position within can 14, motor 12 may also be conveniently repaired or tuned up. The motor can be started and operated within receptacle 14 to make adjustments and tests during repairs and tune-up.

Although cross member 22 and leg members 18 may be constructed from components of various widths and thicknesses to accommodate outboard motors of various sizes, for safety reasons if a typical garbage can is used as receptacle 14, the maximum size motor supported by mounting apparatus 10 should be limited to approximately ten horsepower. A larger motor may overload the can.

After motor 12 has been removed, mounting apparatus 10 is readily disassembled by simply lifting cross member 20 upwardly away from leg members 18 and then pivoting the leg members so that corner notches 22 clear rim 16. The leg members are then simply lifted away from rim 16 and conveniently stored with cross member 20. It will be appreciated that the components of mounting apparatus 10 are light and compact enough to be easily transported from place to place so that motor 12 need not always be carried to the same location for cleaning or repairing.

As will be apparent to those skilled in the art to which the invention is addressed, the present invention may be embodied in forms or embodiments other than that specifically disclosed above, without departing from the spirit or essential characteristics of the invention. The particular embodiment of the outboard motor mounting frame 10 described above is therefore to be considered in all respects as illustrative and not restrictive, i.e. the scope of the present invention is set forth in the appended claims rather than being limited to the example of the outboard motor mounting frame 10 as set forth in the foregoing description.

What is claimed is:

1. For use with a receptacle fillable with water and having an open, rimmed top, a portable mounting frame for supporting an outboard motor within the receptacle, said mounting frame comprising:

a pair of elongate, spaced apart leg members of a length long enough to span across at least a portion of the receptacle, said leg members having:

first and second end portions resting on the rim of the receptacle, and a corner notch formed in the underside of each leg first end portion for bearing against the top and inside of the rim of the receptacle;

hook members mounted on the first end portion of said leg members to hook over the outside of the receptacle rim to cooperate with said corner notches to lock the first end portion of said leg members in engagement with the rim of the receptacle; and a cross member detachably interconnectible with the leg second end portions to transversely interconnect said leg members, said cross member serving as a mounting member for the outboard motor.

2. An outboard motor mounting frame according to claim 1, wherein said leg second end portions include upwardly open second notches; and said cross member includes corresponding downwardly open notches slidably engageable with and disengageable from said leg second notches.

3. An outboard motor mounting frame according to claim 2, wherein said leg members spread transversely outwardly away from each other as they extend away from said cross member.

4. An outboard motor mounting frame according to claim 2, wherein:

said leg second notches are beveled in a direction transversely to the length of said legs; and said cross member notches are beveled in a direction transversely to the length of said cross member to thereby closely engage within said leg second end notches to lock said leg members together in askewed relationship to each other so that the first end portions of said leg members are disposed further apart from each other than the distance separating the second end portions of said leg members.

5. An outboard motor mounting frame according to claim 2, wherein in vertical cross section said leg members are tapered along their lengths in the direction away from said leg second end portions and toward said leg first end portions.

6. An outboard motor mounting frame according to claim 1, wherein the underside of said cross member is spaced slightly above the underside of said leg second end portions.

7. An outboard motor mounting frame according to claim 1, wherein the length of said cross member is approximately equal to the length of said leg members.

8. A support frame for supporting an outboard motor within a water bearing receptacle having an open top defined by a rim, said support frame comprising:

a pair of elongate, spaced-apart leg members of lengths long enough to span across a portion of said open top, said leg members including first and second end portions resting on the receptacle rim;

means for locking said leg first end portions in engagement with the receptacle rim, said locking means includes;

a corner notch formed in the underside of each leg first end portion for engaging against the top and inside portions of the receptacle rim, and a hook member detachably connectible with each leg first end portion to cooperate with said corner notch to form a downwardly open slot for receiving and hooking the receptacle rim; and a cross member securely interconnecting the second end portions of said leg members to serve as a mounting member for the outboard motor, said cross member slidably, detachably interconnectible with said leg members.

* * * * *